Patented Aug. 29, 1933

1,924,744

UNITED STATES PATENT OFFICE 1,924,744

PREPARATION OF REFRACTORY MORTAR

Elisabeth Lux, Essen, Germany, assignor, by mesne assignments, to The Koppers Company of Delaware, Pittsburgh, Pa., a corporation of Delaware No Drawing. Application February 17, 1931, Serial No. 516,517, and in Germany July 29, 1929

1 Claim. (Cl. 106—9)

This invention is for improvements in or relating to the preparation of refractory mortar and relates particularly to the preparation of highly refractory clay-free silica mortar and it is an object of the invention to prepare a clay-free mortar with as good a plasticity and as easily workable as the ordinary clay-containing mortars.

According to the invention a refractory clay-free silica mortar comprising materials rich in silica, such as quartzite, sand or the like, an insoluble lime compound and an organic binder, is characterized in that the binding material contains a starch, preferably a starch capable of swelling in cold water and another binder capable of reducing the viscosity of the starch, for example, sulphite cellulose waste liquor.

In carrying out the invention refractory quartzite, sand or broken pieces of silica brick are ground up finely in known manner and mixed with lime compounds, such as calcium carbonate, calcium sulphate or calcium phosphate which are either insoluble or very slightly soluble. The organic binder which is now added to the above mixture consists on the one hand of starchy materials, which in dilute solution are highly viscous, and on the other hand of a binder such as sulphite cellulose waste liquor or lignin, which has the property of giving greater fluidity to the binder. These materials may be added in a liquid or dry state.

This selected combination of binding mediums enables a mortar to be produced with sufficient viscosity to inhibit the settling of the coarser particles. Furthermore, the mortar does not stiffen too rapidly and the soaking up of moisture from the mortar by the bricks which usually occurs in the case of clay-free mortars is also prevented. The mixing up of the materials of the mortar with the binder is also considerably facilitated.

Another advantage possessed by a mortar prepared according to the invention is, that a very small amount of binder (about 1%) is sufficient, whereas in other cases a considerably higher amount is necessary.

The following is an example of a mortar prepared according to the invention:—

50 parts by weight of ground quartzite (particles under 1 m.m.) and 50 parts by weight of ground sand (particles under 0.5 m.m.) are mixed together in a mixer with the addition of 5 parts of calcium carbonate in the form of a fine powder. There is then added 0.6% of a starch preparation soluble (capable of swelling) in cold water and 0.3 parts of dry residue from sulphite cellulose liquor ("silicanite"). The materials are dry mixed.

The added materials (organic binders) may conveniently be mixed up with only a part of the siliceous materials (quartzite, sand and the like) and the rest of the latter may be added later when required for use. An example of the latter procedure is as follows:—

100 parts by weight of finely ground sand (particles up to 0.1 m.m.) are mixed with 10% of very finely ground calcium carbonate.

There is then added a mixture of 1.4 parts of water soluble starch preparation and 0.6 parts of dried sulphite waste liquor.

After thorough mixing, this mixture is put up in sacks. When required for use, one part of the mixture is mixed with one part of silver-sand (particles up to 1 m.m.) and the whole is then mixed with enough water to enable the mortar to be worked easily.

I claim:—

A clay-free refractory mortar composition comprising: silica; an insoluble lime compound; and about 1% of an organic binder comprising both a starch capable of swelling in cold water and dry residue from sulphite cellulose liquor.

ELISABETH LUX.